Nov. 29, 1955   E. M. GREER   2,725,252
SECURING MEANS FOR A CLOSURE PLUG FOR A PRESSURE VESSEL
Filed June 4, 1951
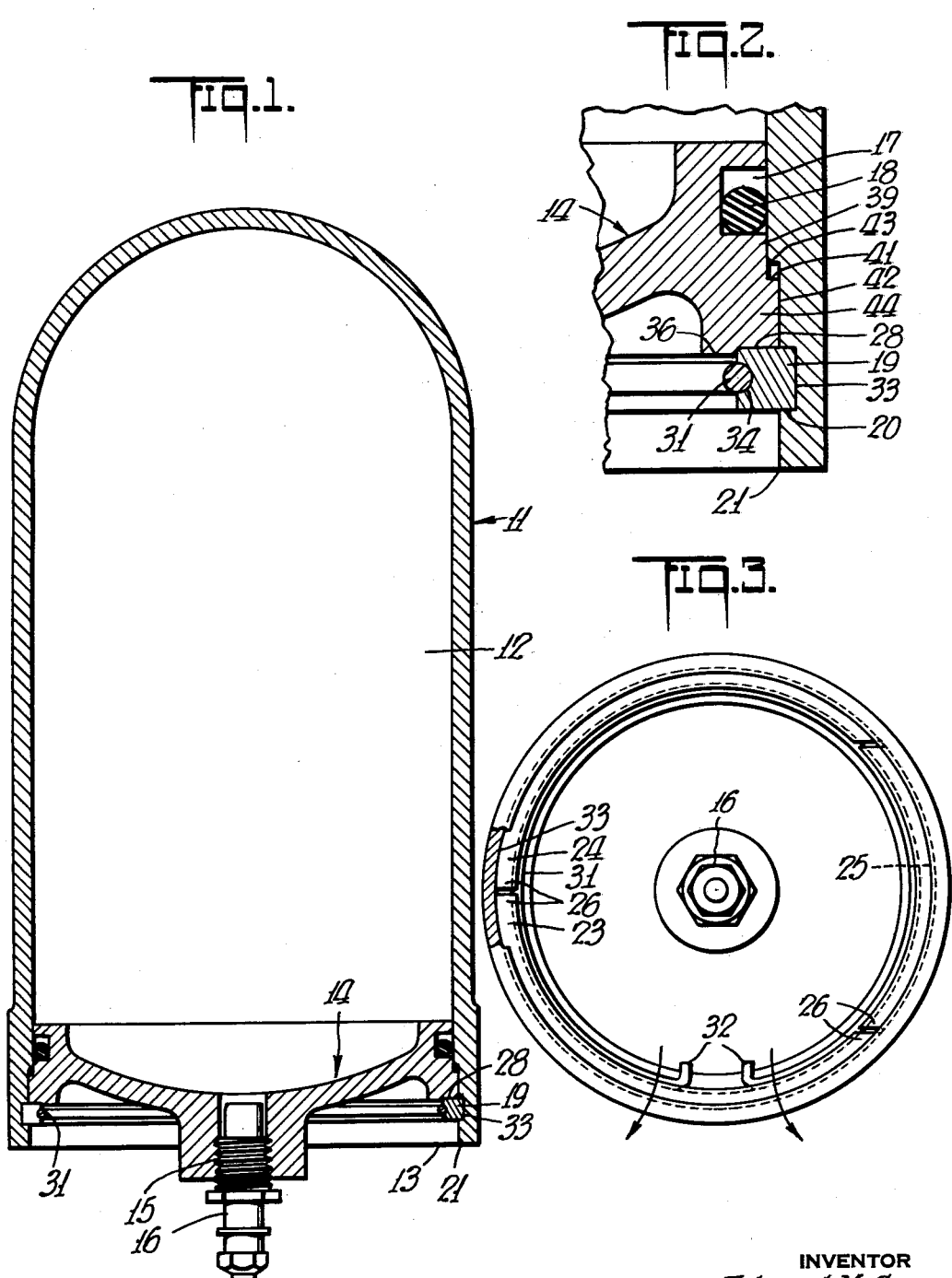
INVENTOR
Edward M. Greer
BY
Dean Fairbank & Hirsch
ATTORNEYS United States Patent Office 2,725,252
Patented Nov. 29, 1955

2,725,252

SECURING MEANS FOR A CLOSURE PLUG FOR A PRESSURE VESSEL

Edward M. Greer, West Hempstead, N. Y., assignor to Greer Hydraulics, Inc., a corporation of New York Application June 4, 1951, Serial No. 229,802

3 Claims. (Cl. 292—256.65)

This invention relates to vessels or containers for storing fluid under pressure and more particularly to the closure plug of such vessel.

As conducive to an understanding of the invention, it is noted that where the container has an opening or port with a removable closure plug therein, the use of a threaded plug is undesirable in that the threads may become worn and stripped with likelihood of blowing out of the plug when high pressures are attained in the container. In addition, if such closure plug can be removed before substantially all of the pressure is relieved in the container, when the plug is partially released by the mechanic disassembling the container, it will suddenly blow out and may cause severe injury.

It is accordingly among the objects of the invention to provide a container for storing fluid under pressure having a port with a removable closure plug therein which is dependably retained in such port and automatically locked therein so long as any substantial pressure remains in the container, which may readily be removed from such port without the need for any tools when such pressure is reduced to a predetermined minimum amount, which plug and associated retaining means are simple in construction and may readily be fabricated at low cost.

According to the invention, the pressure vessel comprises a rigid container having a bore therethrough defining a port and a plug is slidably mounted in said port to close the latter. A deformable retaining ring is provided in an annular groove in said port between said plug and the outer end of said bore having an inner diameter less than the outer diameter of said plug and an outer diameter greater than that of said port to retain the plug in said port, and locking means are desirably provided on said plug which coact with said retaining ring to prevent lateral displacement of said ring out of said annular groove, said plug being movable a sufficient distance into said port when the pressure in the container is sufficiently high to move said locking means clear of said retaining ring so that the latter may be removed.

In the accompanying drawings in which is shown one or more of various possible embodiments of the several features of the invention, Fig. 1 is a longitudinal sectional view of the pressure vessel, Fig. 2 is a fragmentary detail view on a greatly enlarged scale of the plug retaining means, and Fig. 3 is a bottom plan view of the vessel.

Referring now to the drawings, in Fig. 1 is shown a pressure vessel which illustratively is a substantially cylindro-spherical container 11, the bore 12 of which defines a port 13 at one end. Positioned in said port is a plug 14 of outside diameter but slightly less than that of the port 13 so that it is slidable therein and desirably having an air inlet 15 with a suitable valve 16 by means of which the container may be charged.

The plug 14 desirably has an annular groove 17 in the outer periphery thereof in which is positioned a resilient seal member 18, preferably an O ring of conventional type to form a seal between the plug 14 and the wall of port 13.

Means are provided securely yet removably to retain the plug 14 in the port 13. Such means desirably comprises a retaining ring 19 which is deformable so that it may be positioned in an annular groove 20 in the wall of port 13 between the plug 14 and the outer end 21 of such port.

In the illustrative embodiment herein shown, the retaining ring is preferably rectangular in cross section and desirably of hardened metal capable of withstanding high sheering stresses. As shown in Fig. 3, the retaining ring desirably comprises a plurality of arcuate segments illustratively three in number, and designated 23, 24 and 25, said segments when assembled, forming an annulus. The end faces 26 of adjacent segments extend parallel to a line extending diametrically across the annulus so that the adjacent faces 26 of segments 23 and 24, for example are parallel to a radius of said annulus and the adjacent faces 26 of segments 23, 25 and 24, 25 extend obliquely with respect to a radius of said annulus.

The segments 23, 24 and 25 are of greater width than the depth of annular groove 20 which is also desirably rectangular in cross section, and the annulus defined by said segments has an inner diameter less than the outer diameter of plug 14. As a result, the segments will extend radially inward of the wall of the port 13 of the cylinder 11 in the path of movement of the plug 14 so that the periphery of the outer surface 28 of the latter may abut against the retaining ring 19 to be retained in said port.

Means are desirably provided to retain the segments 23, 24, 25 in annular groove 20, when the device is initially assembled. Such means may comprise a resilient member, preferably a snap ring 31 formed from a length of resilient spring material having its ends inwardly curved as at 32 to facilitate insertion and removal of said snap ring. The snap ring is desirably conformed so that the ends thereof will tend to move outwardly in the direction of the arrows. Thus when the snap ring is inserted into the device to coact with the inner periphery of the segments, the latter will be urged outwardly toward and against the wall 33 of annular groove 20.

In order that the snap ring 31 may be restrained from displacement with respect to the segments 23, 24 and 25, the inner periphery of each segment has an arcuate groove 34 therein, said groove being aligned when the segments are assembled into an annulus to form an annular groove to seat the snap ring.

The construction thus far described is not per se claimed herein as it is substantially shown and described in co-pending application Serial No. 224,220, filed May 2, 1951, now abandoned.

According to the present invention, means are provided to prevent removal of the plug 14 from port 13 in the event that any substantial air pressure remains in the container 11.

To this end the plug 14 has a projecting portion 36, preferably an annulus extending outwardly from the outer surface 28 of the plug 14 at substantially right angles thereto. The annular projecting portion 36, which is desirably substantially rectangular in cross section, has an outer diameter but slightly less than the inner diameter of the retaining ring 19 so that it may coact with said ring to prevent lateral displacement thereof out of annular groove 20.

Means are desirably provided to limit the inward movement of the plug into the port 13, yet provide sufficient displacement of such plug so that the annular projecting portion 36 will be moved clear of the retaining ring for removal thereof.

To this end the plug 14 is desirably of reduced diameter at its inner end as at 39 to form an annular shoulder 41 and the outer end of the bore 12 of the port 13 is of enlarged diameter as at 42 to form an annular shoulder 43 against which shoulder 41 may abut.

As shown in Figs. 1 and 2, the retaining ring 19 is spaced from annular shoulder 43 by a distance greater than the thickness of the peripheral portion 44 of plug 14 therebetween to permit axial displacement of the plug in the port. The distances between retaining ring 19 and shoulder 43 is such that the amount of displacement of plug 14 is greater than the amount that the annular projecting portion 36 extends beyond the outer surface 28 of the plug so that the projecting portion may be moved clear of retaining ring 19.

In assembling the device, the plug 14 with its encompassing seal ring 18 is positioned in the bore 12 of container 11 and moved inwardly until shoulder 41 abuts against shoulder 43. The segments 23 and 24 are thereupon inserted into the annular groove 20 so that the end faces 26 thereof which extend parallel to a radius of the annulus are substantially in engagement, as shown in Fig. 3. The segment 25 is thereupon readily insertable into annular groove 20 between the spaced oblique end faces 26 of segments 23 and 24. The snap ring 31 is then compressed and positioned in the arcuate grooves 34 formed in the inner periphery of the segments and thereupon released to urge such segments into the groove 20.

When a fluid, such as air under pressure, is forced through the air valve 16 into the container 12, such compressed air automatically will force the plug 14 outwardly until the outer surface 28 thereof abuts against the retaining ring 19, the latter securely retaining the plug in the container. Such movement of the plug will cause the annular projecting portion 36 thereof to move into the retaining ring 19, thereby locking the latter in annular groove 20.

It is apparent that a mechanic cannot remove the plug 14 without first removing the segments 23, 24 and 25 from the annular groove 20 and such removal is impossible as long as the annular projecting portion 36 of the plug abuts against the retaining ring. In order for the projecting portion 36 to be moved clear of the retaining ring, the mechanic would first have to press on the plug 14 to move it into the port 13 until the shoulder 41 thereof abutted against shoulder 43. However, such inward movement of the plug would be substantially impossible if any substantial air pressure remained in the container. Consequently there is substantially no danger of injury to a mechanic as a result of the plug being blown out of the shell during disassembly.

As the highly desirable safety locking construction above described utilizes only those parts ordinarily needed to retain the plug 14 in the container 11 and requires but a relatively simple machining of the plug and the container, it is relatively low in cost, dependable in operation, and not likely to become deranged even after long use.

As many changes could be made in the above construction and many apparently widely different embodiments of this invention could be made without departing from the scope of the claims, it is intended that all matter contained in the above description shall be interpreted as illustrative and not in a limiting sense.

Having thus described my invention, what I claim as new and desire to secure by Letters Patent of the United States is:

1. A vessel for storing a fluid under pressure comprising a rigid container having a bore therethrough defining a port, a plug in said port to close the latter, said port having an annular groove in the wall thereof interposed between said plug and the outer end of said port, a retaining ring in said annular groove, said retaining ring comprising a plurality of rigid arcuate segments defining an annulus having an inner diameter less than the outer diameter of said plug and an outer diameter greater than that of said port whereby upon movement of said plug against said retaining ring said retaining ring will retain said plug in said port, and a projecting portion on said plug extending outwardly from the outer face thereof at substantially right angles thereto and adapted to coact with said retaining ring when said plug is against the latter to prevent lateral displacement of said segments out of said annular groove, said plug being slidably mounted in said port and means to limit the sliding movement of said plug into said port for movement of said plug a sufficient distance in said port to move said projecting portion clear of said segments, whereby the latter may be removed from said annular groove.

2. A vessel for storing a fluid under pressure comprising a rigid container having a bore therethrough defining a port, a plug slidably mounted in said port to close the latter, a shoulder in said port to limit the inward movement of said plug, said port having an annular groove in the wall thereof interposed between the plug and the outer end of said port, a retaining ring in said annular groove, said retaining ring comprising a plurality of rigid arcuate segments defining an annulus having an inner diameter less than the outer diameter of said plug and an outer diameter greater than that of said port, a removable snap ring adapted to engage the inner peripheries of said arcuate segments, said snap ring being stressed to urge said segments into said annular groove whereby upon movement of said plug against said retaining ring said retaining ring will retain said plug in said port, and an annular projecting portion on said plug extending outwardly from the outer face thereof at substantially right angles thereto, said annular projecting portion having an outer diameter slightly less than the inner diameter of said retaining ring thereby to coact therewith when the plug is against the latter to prevent lateral displacement of said segments out of said annular groove, said retaining ring being spaced from said shoulder by a distance greater than the thickness of the plug therebetween to permit displacement of said plug, the amount of such displacement being greater than the amount that said annular projecting portion extending beyond the outer face of said plug, whereby said plug may be moved into said port a sufficient distance to move said annular projecting portion clear of said retaining ring for removal of the latter.

3. A vessel for storing a fluid under pressure comprising a rigid container having a bore therethrough defining a port, a plug slidably mounted in said port to close the latter, said plug being of reduced diameter at its inner end defining an annular shoulder, a shoulder in said port coacting with the shoulder of said plug to limit the inward movement thereof, said port having an annular groove in the wall thereof interposed between said plug and the outer end of said port, a retaining ring in said annular groove, said retaining ring comprising a plurality of rigid arcuate segments defining an annulus having an inner diameter less than the outer diameter of said plug and an outer diameter greater than that of said port, whereby upon movement of said plug against said retaining ring said retaining ring will retain said plug in said port, each of said segments having an arcuate groove in the inner periphery thereof, said grooves defining an annular groove when said segments are assembled into an annulus, and a snap ring adapted to seat in said annular groove, said snap ring being stressed to urge said segments into said annular groove in said port, and an annular projecting portion on said plug extending outwardly from the outer face thereof at substantially right angles thereto, said annular projecting portion having an outer diameter slightly less than the inner diameter of said retaining ring, thereby to coact therewith when the plug is against the latter to prevent lateral displacement of said segments out of said annular groove, said retaining ring being spaced from said shoulder by a distance greater than the thickness of the plug therebetween to permit displacement of said plug, the amount of such displacement being greater than the amount that said annular projecting portion extends beyond the outer face of said plug, whereby said plug may be moved into said port a sufficient distance to move said annular projecting portion clear of said retaining ring for removal of the latter.

References Cited in the file of this patent

UNITED STATES PATENTS

| | | |
|---|---|---|
| 769,896 | Gapp | Sept. 13, 1904 |
| 1,016,620 | Gapp | Feb. 6, 1912 |
| 1,326,124 | Vischer, Jr. | Dec. 23, 1919 |
| 2,029,606 | Bredtschneider | Feb. 4, 1936 |
| 2,196,895 | Bowman | Apr. 9, 1940 |
| 2,226,495 | Jacocks | Dec. 24, 1940 |
| 2,268,507 | Gertzon | Dec. 30, 1941 |
| 2,273,186 | Fischer | Feb. 17, 1942 |
| 2,281,145 | Duey | Apr. 28, 1942 |
| 2,390,445 | Mercier | Dec. 4, 1945 |
| 2,401,856 | Brock | June 11, 1946 |
| 2,436,407 | Stephens | Feb. 24, 1948 |
| 2,665,877 | MacGregor | Jan. 12, 1954 |

FOREIGN PATENTS

| | | |
|---|---|---|
| 362,724 | Great Britain | Dec. 10, 1931 |